Patented Feb. 8, 1944

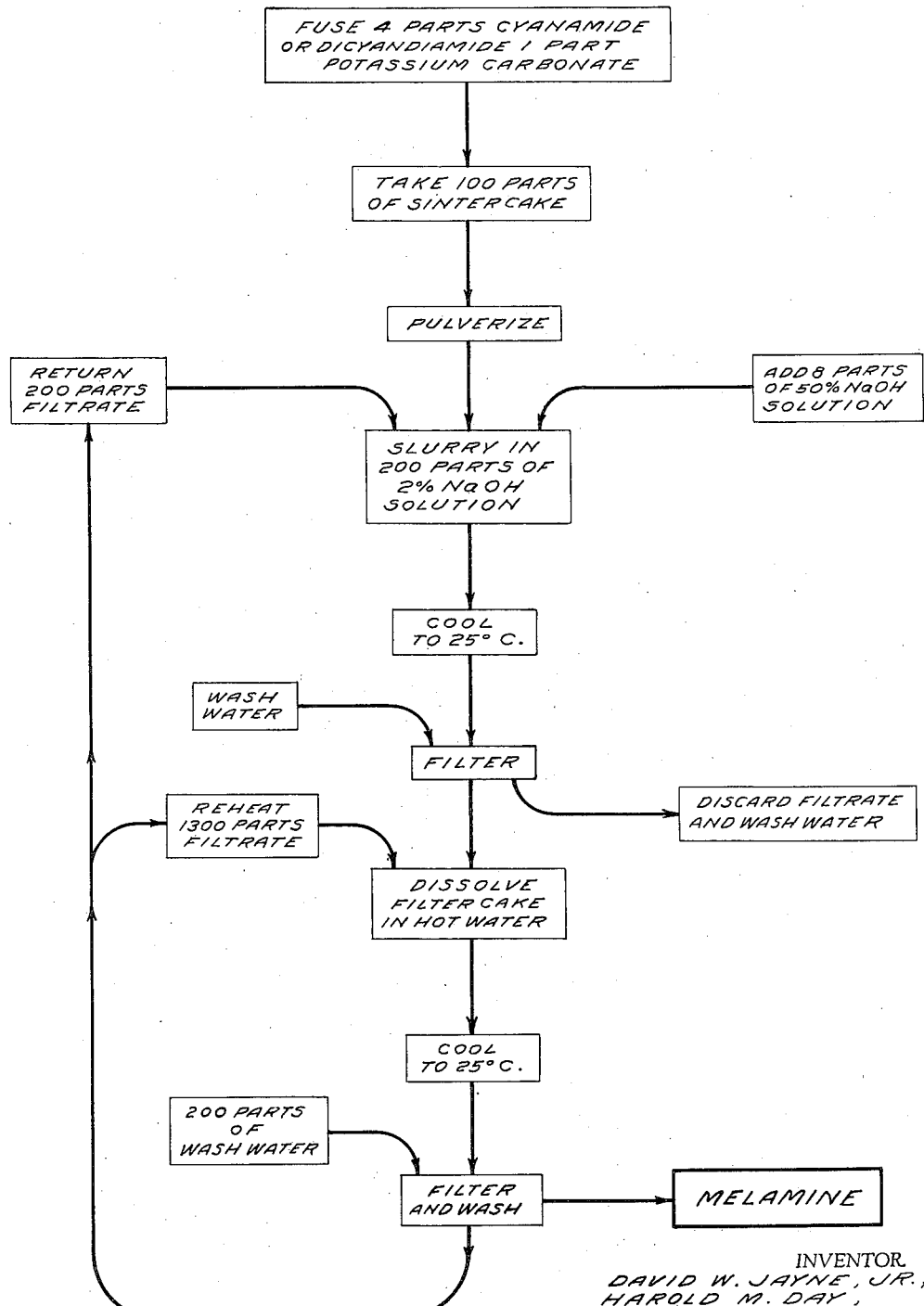

2,341,180

UNITED STATES PATENT OFFICE 2,341,180

METHOD OF PREPARING MELAMINE

David W. Jayne, Jr., Old Greenwich, and Harold M. Day, Cos Cob, Conn., assignors to American Cyanamid Company, New York, N. Y., a corporation of Maine Application April 25, 1941, Serial No. 390,288

11 Claims. (Cl. 260—249.5)

This invention relates to a process for the manufacture of melamine from cyanamide or dicyandiamide by a fusion process.

It is well known that when cyanamide and dicyandiamide are heated to a temperature approaching the melting point, a violent exothermic reaction takes place with the evolution of ammonia. Some melamine is formed in this reaction, but the yield is low because the chief products are melamine deamination products such as melam, melem and mellon that are formed by reason of the uncontrollable nature of the reaction.

Attempts have been made to control this reaction temperature by utilizing substances capable of functioning as heat buffers as, for example, iron powder, sand, mineral oil, etc. Although the violence of the reaction may be reduced by heat buffers of this type, they must necessarily be present in large quantities, as compared with the amount of cyanamide or dicyandiamide, and therefore the working capacity of the apparatus is greatly reduced. Furthermore, the use of a heat buffer presents the problem of separation thereof from the melamine and other products formed in the reaction.

It is a principal object of the present invention to provide a heat conversion method for cyanamide or dicyandiamide in which the exothermic nature of the reaction itself is modified, as compared with prior proposals that simply provide improved means for dissipating heat. A further object of the invention resides in a process for the production of melamine in which relatively high conversion yields are obtained in a simple apparatus, and in which a melamine of high purity may be readily and cheaply obtained from the reaction product.

We have found that the presence of substantial quantities of a solid alkali metal salt in admixture with cyanamide or dicyandiamide will result in a modification of the heat conversion of these compounds. Instead of the violent exothermic reaction that takes place when cyanamide or dicyandiamide is heated alone, there is only a quiet fusion with no uncontrollable rise in temperature when either or both of these compounds is heated in admixture with a solid alkali metal salt. Moreover, the fusion begins at about 185° C., as compared with over 200° C. for cyanamide or dicyandiamide, and the lower fusion temperature of course aids materially in controlling the course of the reaction.

The solid alkali metal salts which we have found to produce optimum results, when used in admixture with cyanamide, dicyandiamide or both, are the alkali metal salts of weak, non-oxidizing acids. By the term "weak acid" we mean an acid, the alkali metal salt of which will produce a pH substantially greater than 7 when dissolved in water, and by "alkali metal salt" of such an acid we mean a salt which will exhibit this property. Thus for example trisodium and tripotassium phosphates are salts which react alkaline in aqueous solution, and very good results have been obtained when dicyandiamide is fused in admixture with these compounds. Monosodium dihydrogen phosphate (NaH$_2$PO$_4$), on the other hand, reacts acid in aqueous solution, and the results obtainable with this compound are very poor. It should be understood, therefore, that the term "alkali metal salt of a weak acid", as used in the present specification and claims, is intended to characterize an alkali metal salt having an alkaline reaction in water.

In addition to the foregoing limitation, the acid or acidic group with which the alkali metal is combined to form a salt should be a non-oxidizing acid; that is to say, the salt should not be an oxidizing agent. Thus, for example, sodium hypochlorite, sodium permanganate and sodium cyanate are unsatisfactory for use in practicing our invention and are excluded, not because of the pH of their aqueous solutions, but because they are oxidizing agents. An oxidizing agent cannot be present in the successful practice of our invention because in that case the product would be ammeline instead of the melamine which it is the object of our invention to produce.

With the foregoing limitations any alkali metal salt may be used in practicing the process of our invention and will give improved results, as compared with the results obtained when no salt is used in the fusion. Typical salts that we have used include disodium and dipotassium carbonate, sodium and potassium bicarbonate, tripotassium phosphate, dipotassium phosphate, trisodium phosphate, sodium cyanide, potassium cyanide, sodium phenolate, potassium phenolate, and mixtures of two or more of the above compounds. In some cases we have found that improved results are obtained when small amounts of a free alkali such as sodium or potassium hydroxide are added to the charge.

The above and similar compounds are preferably used in the ratio of from 1 to 4 parts by weight of the compound with about 4 to 6 parts by weight of cyanamide or dicyandiamide, and preferably in intimate admixture therewith.

Usually it is preferable to start with dehydrated materials, but the presence of small amounts of water does no harm as the mixture must be heated to fairly high temperatures before the sintering begins.

The reaction mixture is preferably heated in the form of a fairly thin layer on the order of 1 to 3 inches deep, and the heating may be carried out by placing the mixture in shallow trays and heating them either in an oven or on a hot surface. When the temperature of the mixture reaches about 175–190° C. it starts to fuse or sinter, and the sintering spreads throughout the powdered mixture until the whole has become a brittle, porous mass. The reaction is then complete. While the reaction takes place at about 185° C. in most mixtures, somewhat lower or higher starting temperatures may be employed as, for example, a temperature within the range of 160–210° C. Pressure conditions do not affect the reaction, and therefore atmospheric pressures are preferable although of course higher pressures may be used.

One of the most important features of our invention resides in the ease with which a pure melamine product can be recovered from the sinter cake which is obtained by the above described process. On the accompanying drawing we have outlined a method of practicing our process in which a melamine of greater than 99% purity is obtained by a single recrystallization from hot water. Reference to the flow sheet which constitutes the figure of this drawing will show that a sinter cake is first obtained by fusing about 4 parts of cyanamide or dicyandiamide with 1 part of potassium carbonate. 100 parts by weight of this sinter cake is pulverized and slurried in 200 parts of dilute sodium hydroxide solution, which serves to extract any ammeline or similar byproducts of the reaction that may be present. The slurry is cooled and filtered and the filter cake is washed with a small amount of wash water, the combined filtrate and wash water being discarded.

In order to separate the melamine from any insolubles that may be present it is dissolved in hot water and the solution is cooled to room temperature, allowed to crystallize, and the melamine crystals are filtered off and washed with 200 parts of wash water. Advantageously the greater part of the filtrate and washings are reheated and reused for dissolving a second batch of melamine while a small part, roughly equivalent to the amount of wash water used, is returned for slurrying a second batch of sinter cake. The details of the process are as follows:

In working up the first batch, 100 parts of the pulverized sinter cake is slurried in 200 parts by weight of 2% caustic soda solution. This slurry is warmed to 70° C. with agitation, cooled to room temperature and filtered through a plate and frame filter press. The press cake is washed with a small amount of water; usually it is only necessary to employ enough water to displace the slurry liquor originally held in the cake. About 58 parts (dry weight) of filter cake are obtained which is preferably left in the filter press.

In order to dissolve the melamine from the filter cake, about 1300–1500 parts by weight of boiling water is pumped through the filter press. The hot solution of melamine so obtained is then cooled to room temperature and the resulting slurry of crystallized melamine is filtered, washed with cool water, and dried to yield the final product. The final filtrate and washings are combined and saved.

In purifying all subsequent batches of sinter cake the final filtrate and washings from the first batch are reused as the solvent liquor. 8 parts by weight of a 50% caustic soda solution is added to about 200 parts by weight of the final mother liquor from the first batch and the resulting 2% NaOH solution is used for slurrying 100 parts of sinter cake. The resulting slurry is warmed to 70° C. with agitation as before, cooled, filtered and washed, and the filtrate and wash water is discarded. 1300 parts of final mother liquor from the preceding batch is then reheated to boiling and pumped through the filter press to dissolve the melamine as before, after which the solution is cooled and the crystallized melamine is filtered off and dried.

Instead of starting with a mixture containing 20% of potassium carbonate or other alkali metal salt of the type described above, greater quantities up to 50% may be employed and the alkali may be recovered and reused in the preparation of further batches of sinter cake. In a modification of the process illustrated on the accompanying flow sheet this may be accomplished by evaporating to dryness the first filtrate from the slurry of sinter cake and sodium hydroxide solution. Where the cost of alkali is a considerable item of expense this method may be preferred to the procedure outlined above, and also presents the advantage that the caustic soda added in the recovery process is returned to the fusion step where it enhances the action of the alkali metal salt in producing higher conversion yields.

Instead of slurrying the sinter cake with a small amount of dilute alkali, a sufficiently large volume of hot, dilute alkaline solution may be employed to dissolve the melamine along with the other material present in the sinter cake, and in this case the melamine may be recovered directly by cooling and crystallization and the mother liquor containing any impurities that may be present is reused for dissolving a second batch. Thus, for example, 100 parts by weight of pulverized sinter cake may be discharged into 1400 parts by weight of 2% sodium hydroxide solution which is heated to boiling in order to dissolve all the products of the reaction. The solution is cooled to 25° C. and filtered, the filter cake is discharged, and the filtrate returned for dissolving a second batch. The filter cake consists of crystalline melamine of commercial purity.

The invention will be described in greater detail by the following specific examples. It should be understood, however, that these examples are given primarily for purposes of illustration and that the invention in its broader aspects is not limited thereto.

*Example 1*

An intimate mixture of 100 grams of powdered dicyandiamide and 50 grams of powdered anhydrous potassium carbonate was spread out in a shallow pan to a depth of about one inch. The pan was placed in an oven at about 185° C. When the temperature of the mix reached about 180° C. the mix began to quietly sinter or fuse. The sintered area spread throughout the mass until in about ten minutes the entire mix had become a porous friable sintered mass. The reaction cake was cooled, broken up, ground to a powder and slurried in 200 cc. of warm water to dissolve the potassium carbonate and byproducts. The slurry was cooled to room temperature and filtered. The residue was washed thoroughly with water and dried. The product (dry residue) weighed 70 grams. A sample of the product was sublimated. The white crystalline sublimate melted sharply at 354° C. and formed a picrate which melted at 311° C., showing it to be melamine of high purity. This represents a yield of 70% of melamine based on the amount of dicyandiamide used. The mixture of potassium carbonate and byproducts of the reaction, which can be recovered by evaporating the filtrate, may be dehydrated and returned to the cycle and utilized in treating the following batch of dicyandiamide.

Example 2

A powdered intimate mixture consisting of 100 grams of dicyandiamide, 48 grams of anhydrous sodium carbonate and 2 grams of sodium hydroxide was treated according to the same procedure as followed in Example 1. 67 grams of substantially pure melamine were obtained, representing a yield of 67% based on the amount of dicyandiamide used.

Example 3

An intimate mixture of 50 grams of powdered dicyandiamide and 25 grams of potassium phenolate was heated to approximately 185° C. according to the procedure followed in Example 1. The reaction mixture was cooled and slurried in 100 cc. of warm water. The slurry was cooled to room temperature and filtered. The melamine on the filter was washed thoroughly with water and dried.

Example 4

A powdered intimate mixture consisting of 100 grams of dicyandiamide and 100 grams of tripotassium phosphate was spread out in a shallow tray to a depth of ½–1 inch and heated in an oven at 180–185° C. for about 10 minutes. 193 grams of sinter cake were obtained, which sinter cake was cooled, ground to a powder, and slurried in warm water. The slurry was heated to 70° C., cooled to about 20–25° C. and filtered. 65 grams of a crude melamine product were obtained in this manner which, when extracted with hot water and recrystallized, yielded 60 grams of melamine product. This product on analysis was found to be of 99.3% purity.

Example 5

An intimate mixture consisting of 100 grams of dicyandiamide and 25 grams of sodium cyanide was heated to approximately 185° C. according to the procedure followed in Example 1. The reaction mixture was cooled and slurried in warm water. The slurry was cooled to room temperature and filtered. The melamine on the filter was washed with water and dried.

Example 6

A powdered intimate mixture consisting of 100 grams of dicyandiamide and 50 grams of anhydrous sodium carbonate was treated according to the same procedure as followed in Example 1. 56 grams of substantially pure melamine were obtained, representing a yield of 56% based on the amount of dicyandiamide used.

The advantage of having present in the charge a small amount of a substance, such as an alkali hydroxide which may assist in producing a more uniform sintering or fusion, is illustrated by comparing the higher yield of melamine obtained in Example 2 with the yield obtained in this example.

Example 7

An intimate mixture consisting of 100 grams of dicyandiamide, 50 grams of anhydrous potassium carbonate and 15 cc. of water was treated according to the same procedure as followed in Example 1. 50 grams of substantially pure melamine were obtained, representing a yield of 50% based on the amount of dicyandiamide used.

The lower yield of melamine in this example in comparison with that obtained in Example 1 resulted from the excessive amount of water added to the charge.

The melamine may be obtained in a pure state by crystallization from water or by sublimation.

In recycling the byproducts of the reaction, their presence in the charge appears to have the tendency of suppressing the formation of additional quantities of the same and thus increase the yield of melamine. Where desired, instead of recycling the entire amount of recovered catalyst and reaction product or products, this may be replaced in whole or in part by fresh quantities of catalyst alone.

Example 8

88 parts by weight of dicyandiamide and 22 parts by weight of disodium cyanamide ($Na_2CN_2$) were intimately mixed by grinding, spread out in a thin layer, and fused by heating at 180° C. for about 15 minutes. 102 parts by weight of sinter cake were obtained which was pulverized and slurried in 200 parts by weight of water. The slurry was warmed to 70° C., cooled to 25° C. and filtered, and the filter cake was washed and dried. 52 parts by weight of melamine were obtained by this process, which constituted a 55% yield based on the total cyanamide content in both the dicyandiamide and the sodium cyanamide.

This application is a continuation-in-part of our copending application, Serial No. 265,930, filed April 4, 1939.

What we claim is:

1. A method of preparing melamine which comprises the step of fusing at temperatures of about 160–210° C. a solid mixture of a member of the group consisting of cyanamide and dicyandiamide and an alkali metal salt of a weak, non-oxidizing acid.

2. A method of preparing melamine which comprises the step of fusing at temperatures of about 160–210° C. a solid mixture of dicyandiamide and an alkali metal salt of a weak, non-oxidizing acid.

3. A method of preparing melamine which comprises the step of fusing at temperatures of about 160–210° C. a solid mixture of about 1–6 parts by weight of a member of the group consisting of cyanamide and dicyandiamide with 1 part by weight of a solid alkali metal salt of a weak, non-oxidizing acid.

4. A method of preparing melamine which comprises the step of fusing at temperatures of about 160–210° C. a solid mixture of about 1–6 parts by weight of dicyandiamide with 1 part by weight of a solid alkali metal salt of a weak, non-oxidizing acid.

5. A method of preparing melamine which comprises the step of fusing at temperatures of about 160–210° C. a solid mixture containing about 1–4 parts by weight of a member of the group consisting of cyanamide and dicyandiamide, about 1 part by weight of a solid alkali metal salt of a weak, non-oxidizing acid, and a small amount of an alkali metal hydroxide.

6. A method of preparing melamine which comprises the step of fusing at temperatures of about 160–210° C. a solid mixture of a member of the group consisting of cyanamide and dicyandiamide and a solid alkali metal carbonate.

7. A method of preparing melamine which comprises the steps of fusing at temperatures of about 160–210° C. a solid mixture of a member of the group consisting of cyanamide and dicyandiamide and an alkali metal salt of a weak, non-oxidizing acid and extracting the sinter cake by slurrying in a dilute alkali solution.

8. A method of preparing melamine which comprises the steps of fusing at temperatures of about 160–210° C. a solid mixture of about 1–6 parts by weight of dicyandiamide with 1 part by weight of a solid alkali metal salt of a weak, non-oxidizing acid and extracting the sinter cake by slurrying in a dilute alkali solution.

9. A method of preparing a purified melamine which comprises the steps of fusing at temperatures of about 160–210° C. a solid mixture of a member of the group consisting of cyanamide and dicyandiamide and an alkali metal salt of a weak, non-oxidizing acid, extracting the sinter cake by slurrying in a dilute alkali solution, dissolving the remaining solid product in hot water, and crystallizing melamine from the solution.

10. A method of manufacturing melamine which comprises mixing two parts by weight of powdered dicyandiamide with one part by weight of powdered anhydrous potassium carbonate, heating the mixture to a temperature of approximately 185° C., cooling the reaction cake to room temperature, grinding the reaction cake to a powder, slurrying the powder in water, separating the melamine from the solution, drying the melamine, recovering the mixture of potassium carbonate and byproducts of the reaction from the solution, dehydrating said mixture and returning the same to the cycle.

11. A method of manufacturing melamine which comprises mixing two parts by weight of powdered dicyandiamide with one part by weight of powdered anhydrous sodium carbonate, heating the mixture to a temperature of approximately 185° C., cooling the reaction cake to room temperature, grinding the reaction cake to a powder, slurrying the powder in water, separating the melamine from the solution, drying the melamine, recovering the mixture of sodium carbonate and byproducts of the reaction from the solution, dehydrating said mixture and returning the same to the cycle.

DAVID W. JAYNE, JR.
HAROLD M. DAY.